United States Patent
Kaun et al.

[11] Patent Number: 5,942,345
[45] Date of Patent: Aug. 24, 1999

[54] HIGH PERFORMANCE ELECTROLYTES FOR MCFC

[75] Inventors: Thomas D. Kaun, New Lenox; Michael F. Roche, Downers Gorve, both of Ill.

[73] Assignee: University of Chicago, Chicago, Ill.

[21] Appl. No.: 08/909,336

[22] Filed: Aug. 11, 1997

[51] Int. Cl.⁶ .................................................. H01M 8/14
[52] U.S. Cl. ................................ 429/16; 429/33; 429/46
[58] Field of Search ............................ 429/33, 46, 101, 429/102, 105

[56] References Cited

U.S. PATENT DOCUMENTS 4,534,956  8/1985  Arendt et al. ............................ 423/598
4,591,538  5/1986  Kunz ........................................ 429/16
4,895,774  1/1990  Ohzu et al. .............................. 429/35

*Primary Examiner*—Maria Nuzzolillo
*Assistant Examiner*—Angela J. Martin
*Attorney, Agent, or Firm*—Michael D. Rechtin; Foley & Lardner

[57] ABSTRACT

A carbonate electrolyte of the Li/Na or CaBaLiNa system. The Li/Na carbonate has a composition displaced from the eutectic composition to diminish segregation effects in a molten carbonate fuel cell. The CaBaLiNa system includes relatively small amounts of $Ca_2CO_3$ and $BaCO_3$, and preferably of equimolar amounts. The presence of both Ca and $BaCO_3$ enables lower temperature fuel cell operation.

17 Claims, 8 Drawing Sheets

■ 52:48 Li:Na
△ 60:40 Li:Na
✳ 67:33 Li:Na
✕ 40:60 Li:Na

◆ 67:33 Li:Na
■ 5% BaCaNaLi
▲ 10% BaCaNaLi

5,942,345

HIGH PERFORMANCE ELECTROLYTES FOR MCFC

CONTRACTUAL ORIGIN OF THE INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

The present invention relates generally to a molten carbonate type electrolyte and more particularly relates to Li/Na and BaCaNaLi carbonate electrolytes. These electrolytes exhibit substantially reduced segregation and improved fuel cell performance.

Current molten carbonate fuel cells ("MCFC") contain a base mixture of about 62 mole percent ("m/o") $Li_2CO_3$ and 38 m/o $K_2CO_3$. When mixed with lithium aluminate, this mixture serves both as an electrolyte and gasketing for the fuel cell and stack. This system exhibits a broad liquidus range in its phase diagram but has several important drawbacks. When the fuel cell is operated at a high electrochemical load, segregation of the electrolyte occurs within each cell and also within a stack of the cells. Within the cell, segregation increases potassium concentration near the Ni(Li)O cathode, and this leads to increased solubility of the cathode as well as increased corrosion of the cell hardware. This progressive segregation and corrosion results in substantial decline of performance. In the stack of cells, a high voltage potential difference on the gaskets causes electrolyte segregation which floods one end of the bipolar stack while the other end is starved. This further leads both to decline of performance of end cells of the fuel cell and overall lifetime of the fuel cell. Attempts have been made to alleviate the problem by adding external electronic controls or by adding internal manifolding to make segregation more difficult.

In order to overcome some of these difficulties, a Li/Na carbonate of eutectic composition has been developed. However, this composition has a greater wetting ability then the Li/K, and cell performance is reduced to the electrolyte flooding of the electrode and reducing fuel contact area. These problems of segregation have been partially alleviated by altering the electrode structure and chemistry to accommodate the peculiarities of the eutectic Li/Na electrolyte.

Other efforts have been made to diminish segregation by adding $BaCO_3$ or $CaCO_3$ to Li/Na. However, during fuel cell operation, the Ba or Ca precipitated in the pores of the electrode causing reduction in efficiency and operational lifetime.

It is therefore an object of the invention to provide an improved fuel cell.

It is another object of the invention to provide a novel molten carbonate fuel cell (MCFC) having reduced electrolyte segregation and improved MCFC performance.

It is a further object of the invention to provide an improved MCFC containing an off-eutectic Li/Na electrolyte.

It is yet another object of the invention to provide a novel MCFC of about 60–75 mole percent Li in a Li/Na electrolyte.

It is an additional object of the invention to provide an improved MCFC having a LiNaBaCa carbonate electrolyte forming a low melting point eutectoid.

It is also a further object of the invention to provide a novel LiNaBaCa electrolyte composition with 2 to 5 m/o in both Ba and Ca.

It is another object of the invention to provide an improved MCFC electrolyte of Li/Na rare earths for reducing electrolyte segregation.

These and other objects and advantages of the invention will be readily apparent from the following description of the preferred embodiments thereof, taken in conjunction with the accompanying drawings described below.

DETAILED DESCRIPTION OF PREFERRED EMBODIMENTS

Figure 1:
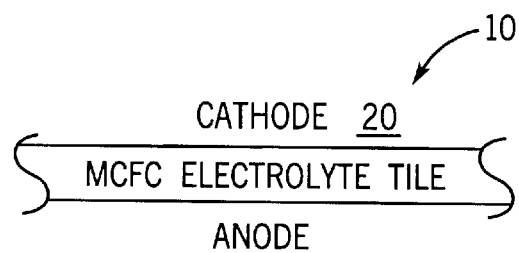
FIG. 1 illustrates a schematic of a typical MCFC fuel cell.
Figure 2:
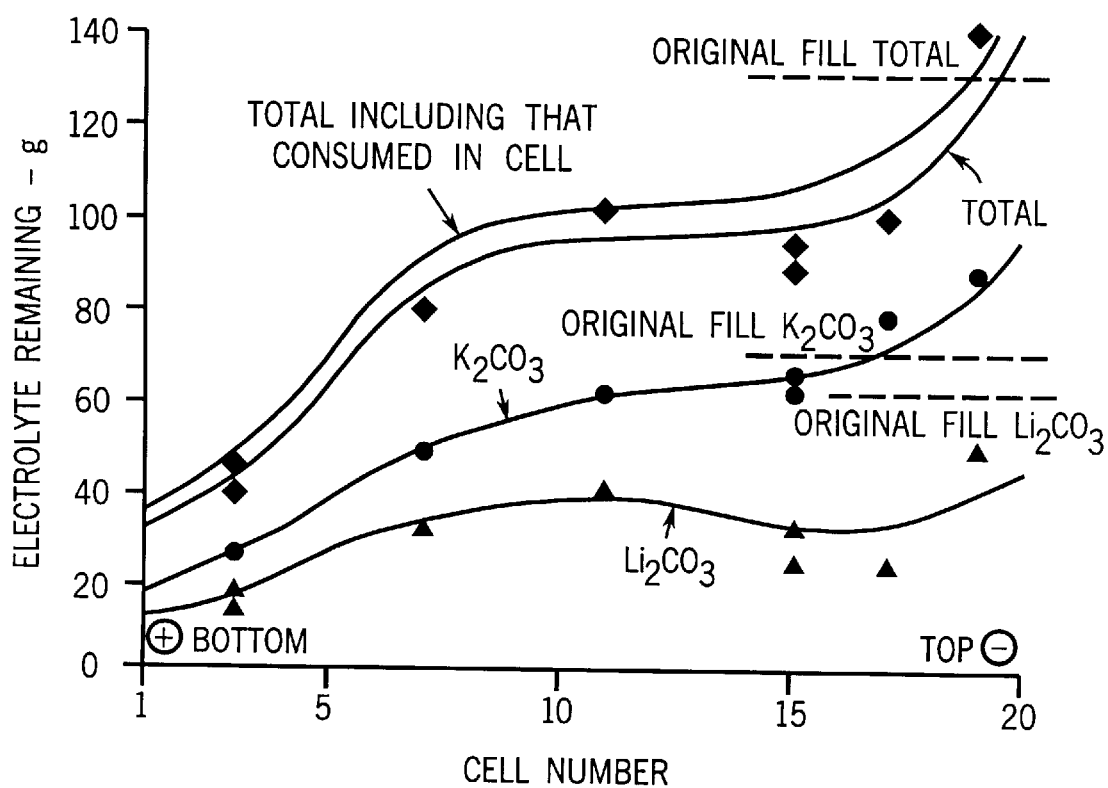
FIG. 2 illustrates Li/K carbonate electrolyte segregation by ratio changes during MCFC operation.

In current methodologies molten carbonate fuel cells (MCFC) 10 (see schematic in FIG. 1) employ a Li/K carbonate mixture. This mixture, usually about 62 m/o $Li_2CO_3$ and 38 m/o $K_2CO_3$, melts below about 550° C. When mixed with lithium aluminate, this mixture serves as both the electrolyte and gasketing for a cell and a stack of cells. As can be seen in FIG. 2, electrolyte segregation occurs causing an increase of potassium concentration near cathode 20 (see FIG. 1) and leads to increased cathode solubility and performance decline. In the stack of cells, the high potential difference on the gaskets causes electrolyte segregation, which leads to severe performance decline of the cells at the end of the stack.

Figure 5:
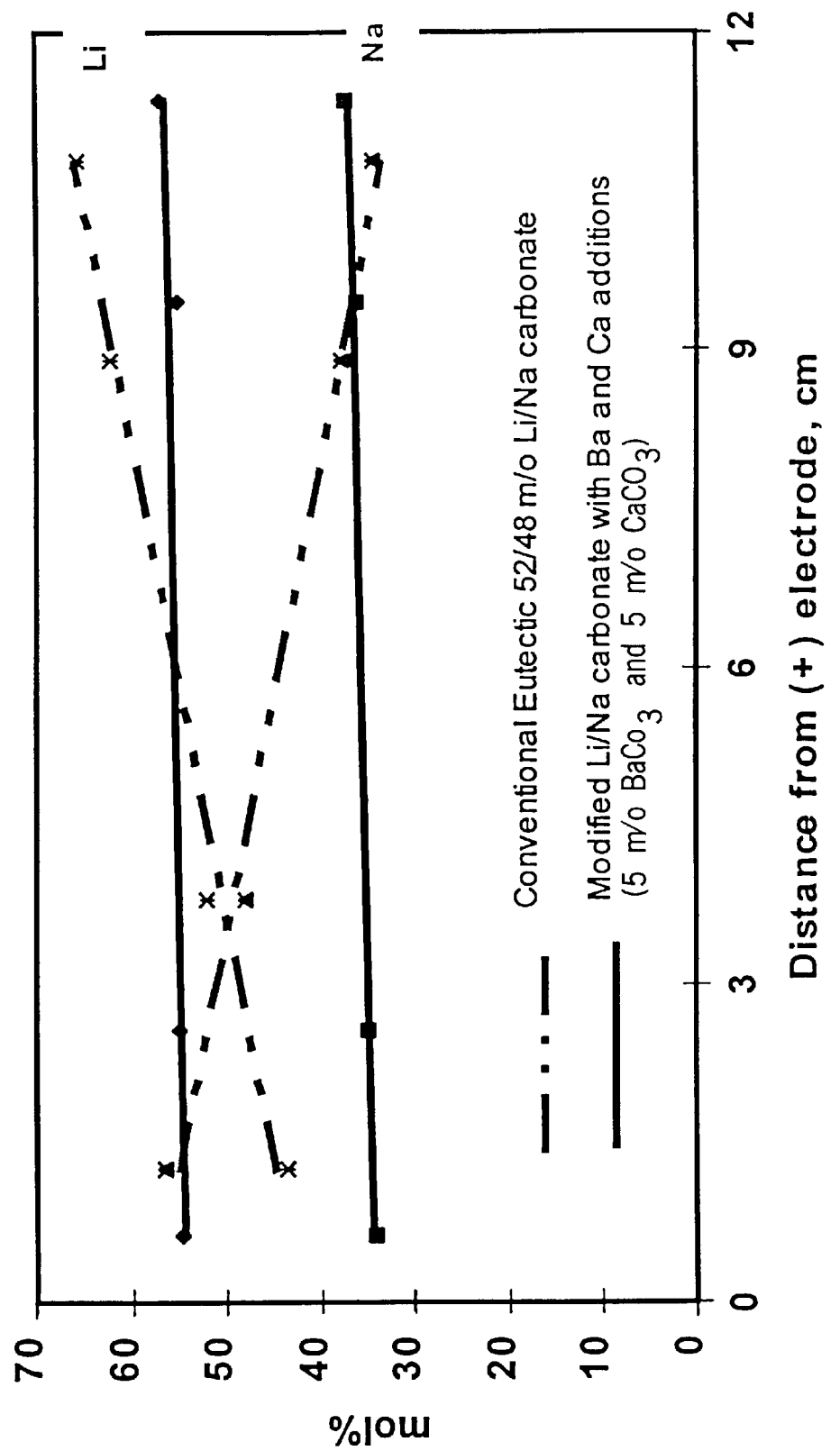
FIG. 5 illustrates another measure of segregation effects for Li and Na over distance from the anode for a comparison of 52/48 m/o Li/Na carbonate with 5 m/o (BaCa) Li/Na composition.

In the invention these difficulties are avoided by developing off-eutectic compositions resulting in greatly reduced segregation effects. These segregation effects were diminished as the distance increased from the eutectic composition (54/48 mo Li/Na) as shown in FIG. 5. In addition, as the compositions approach the liquidus limit at 650° C., the non-segregating property becomes more apparent. Consequently at a composition of, for example, 71.5/28.5 m/o Li/Na the segregation of composition becomes much less than for the 52/48 m/o eutectic. For the Li/Na carbonate system a reduction in segregation occurs over the range of compositions displaced from the eutectic for $Li_2CO_3$ of about 30 to 40 mole percent and about 55 to 80 mole percent.

Figure 8:
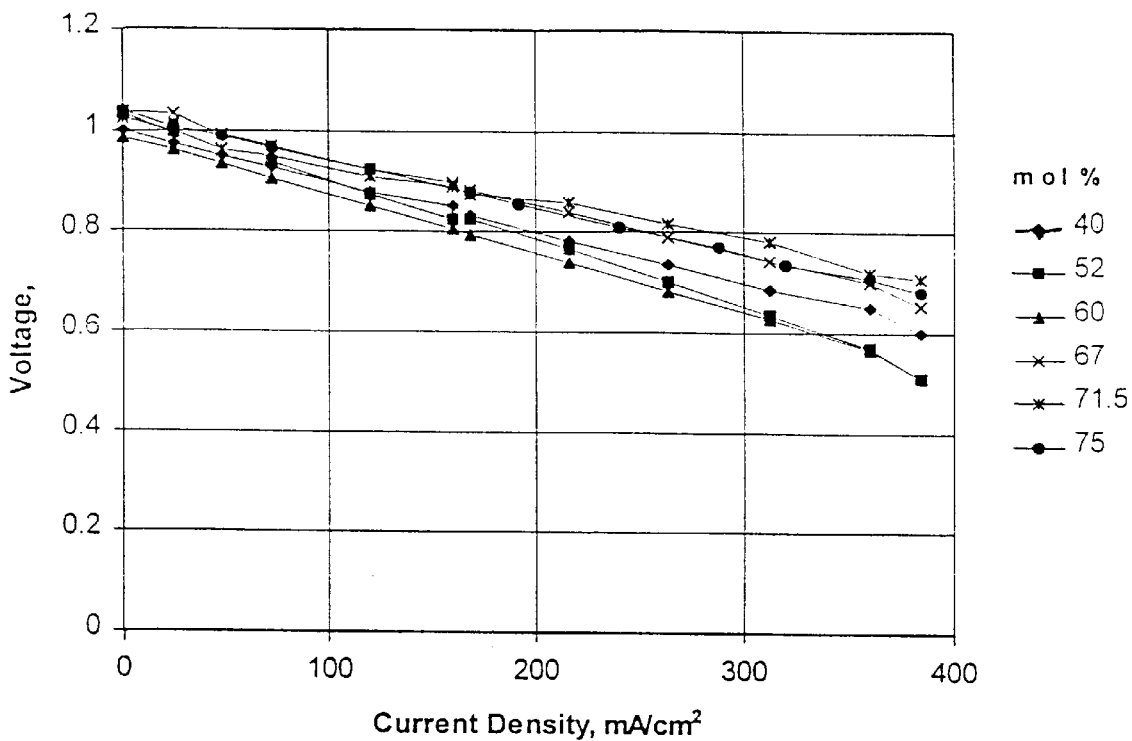
FIG. 8 illustrates polarization plots indicative of cell impedance for six different Li m/o in Li/Na electrolytes.
Figure 9:
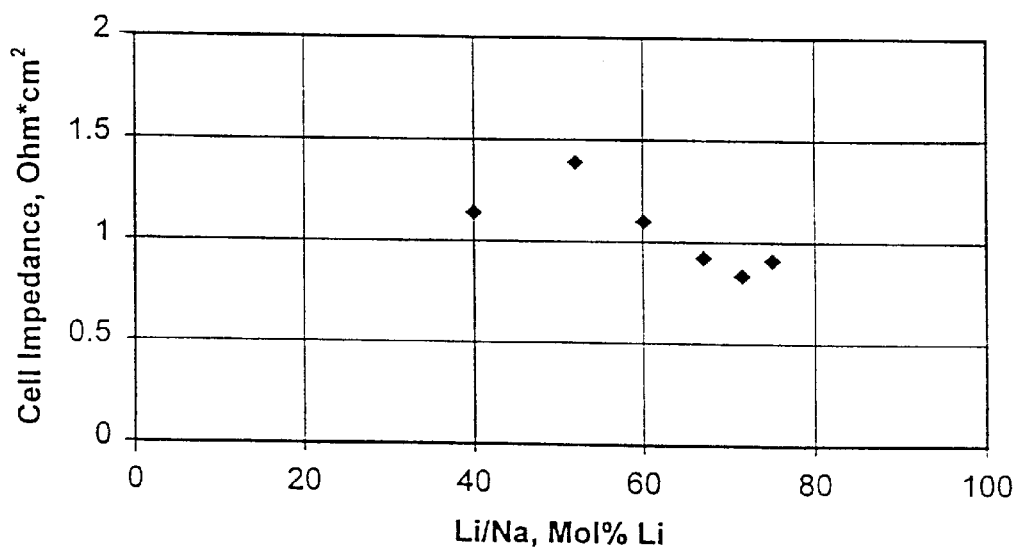
FIG. 9 illustrates cell impedance for Li/Na electrolytes of six different compositions.
Figure 14:
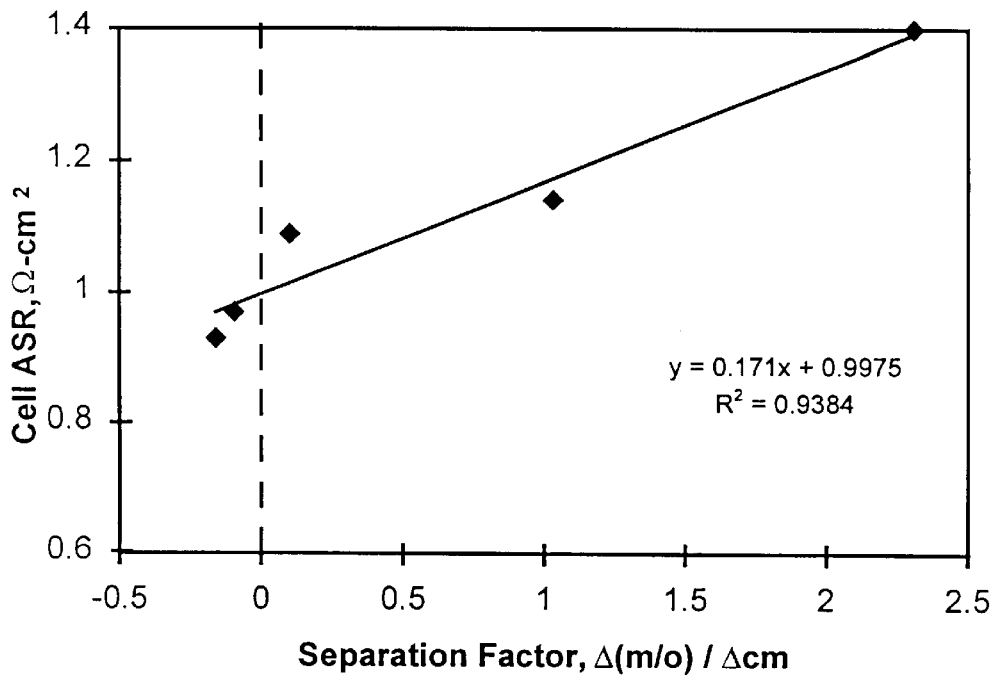
FIG. 14 illustrates a correlation of MCFC cell impedances for a range of Li/Na carbonate compositions (40/60 to 75/25 m/o) compared to separation factors established from our strip segregation-screening tests.

It is generally known that $CO_3^{2-}$ ion conductivity increases with $LiC_2O_3$ content. For example, the 52/48 m/o Li/Na composition has a specific conductance of 2.1 S/cm and the 71.5/28.5 m/o composition 2.4 S/cm. That is, there is a 15–20% increase in conductivity at 650° C. However, all impedance is reduced almost 50% as shown in FIG. 9 by the change in electrolyte composition. Further, the cell performance data shown in FIG. 8 shows that the 71.5/28.5 m/o Li/Na composition exhibits significant performance improvement as compared to the eutectic composition. The 71.5/28.5 m/o Li/Na composition is far from the eutectic and approaches the liquidus limit of 650° C. As shown in FIG. 14, the improved performance of the MCFC 10 is more adequately described by a nonsegregating electrolyte than by increased electrolyte conductivity.

In another embodiment NiO dissolution from the cathode 20 (FIG. 1) can be suppressed by adding both $BaCO_3$ and $CaCO_3$. The addition of both Ba and Ca carbonate overcomes a previous problem of precipitation of Ba or Ca carbonate in electrode pores during cell operation. Therefore, a quaternary electrolyte of LiNaCaBa carbonate forms a eutectoid with a very low melting point (about 450° C.) which in turn allows lower temperature operation of MCFC systems. Preferably, Ca and Ba are about 1–15 mole percent each and most preferably equimolar in forming a eutectoid composition (a surface in the quaternary). Thus, in such a LiNaCaBa system, NiO dissolution from the cathode 20 is suppressed, it exhibits diminished corrosion and also eliminates Ba or Ca precipitation. In addition, under an applied potential of 20V, the LiNaCaBa electrolyte separates less than Li/Na eutectic compositions, as can be seen by reference to FIG. 5. We can expect longer time to short at 250–360 mA/cm² due to lowered NiO solubility.

A further comparison of eutectic Li/Na carbonate electrolyte with 5 m/o CaBaLiNa is shown in FIG. 5. The cation composition was determined across a test strip prepared as explained in the Example. The tests were run at 20 V applied potential. The figure shows the variation in m/o versus distance from the anode. The 2 m/o BaCaLiNa shows a noticeable improvement over eutectic Li/Na (52/48).

In another form of the invention, alkaline earth elements, such as Sr, can be added to these Li/Na Ba/Ca electrolytes to improve cell efficiency and further lower cell separating temperature and extend operating time.

The following examples set forth exemplary, non-limiting methods of preparing MCFC electrolytes and resulting properties.

EXAMPLE I

A standardized screening test for electrolyte segregation was developed based on previous conventional methods in which carbonate-wetted strips were subjected to 5 to 20 V potential gradients. These conditions simulate the gasketing strip of an externally manifolded MCFC. In our test procedure, strips of carbonate-wetted $LiAlO_2$ (provided by Cyprus-Foote Corporation) were made from cold-pressed powders (150 MPa). The strip contained eight gold probes spaced regularly along its length and Ni electrode strips at each end to apply the voltage. At 650° C. a potential of about 20 V was applied across a 12-cm-long bar of material containing electrolyte and $LiAlO_2$. Measured voltage drops along the length of the strip were used to gauge electrolyte content and composition. This assembly was held between two alumina plates (held in compression by a Belleville spring washer) that also formed the gas-flow channels. The strip was purged with a 2:1 $O_2$ to $CO_2$ gas mixture (500 mL/min) at 655±10° C.

The effects of cell chemistry on Li/Na carbonate electrolyte segregation were investigated in 10×10-cm cell tests. Electrolyte tiles containing selected carbonate compositions were prepared and tested at 650° C. in cells containing standard Ni cathodes and anodes, unlike studies by other developers of MCFCs with eutectic Li/Na electrolytes. After an initial conditioning period of at least 500 h and under laboratory-standard oxidant, the current density in the cells was increased to at least 250 mA/cm². The cells were quenched under electric load to maintain electrolyte constituent distribution.

Figure 3:
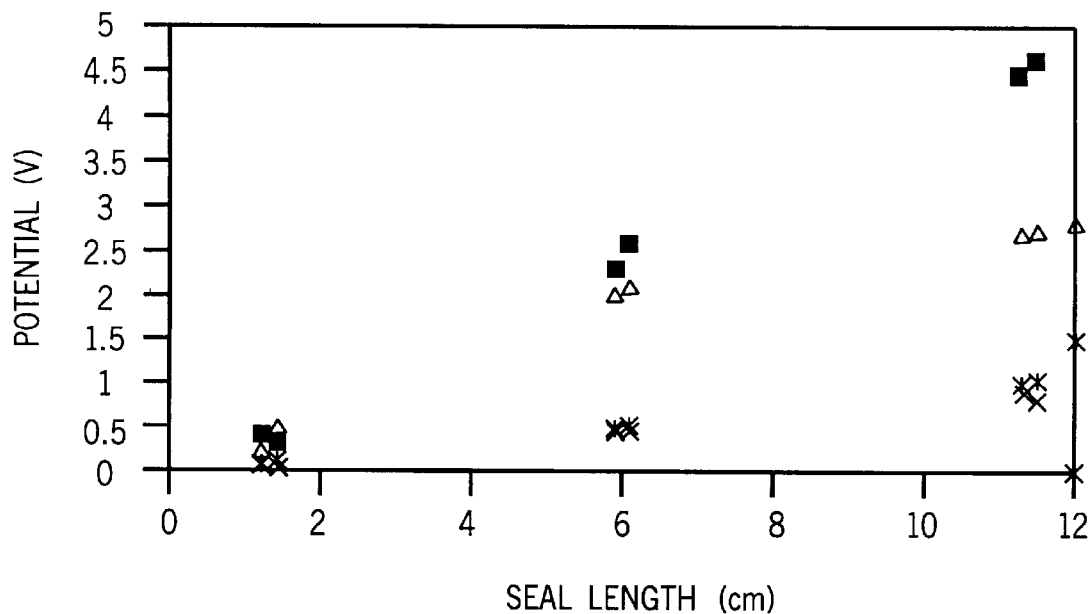
FIG. 3 illustrates voltage distribution of a strip test used to gauge segregation effects in a range of Li/Na electrolyte compositions.

Fully-developed potential distributions after 72 h at 20 V from the strip tests with the four Li/Na carbonate compositions are shown in FIG. 3 (described hereinbefore). The 52/48 composition is very near the eutectic composition of Li/Na carbonate. The potential distribution of off-eutectic Li/Na carbonate compositions equilibrate with less voltage variation than for the near eutectic composition. The strip samples were quenched under load and later examined by metallography. The trend is clear in that the fully developed potential distribution becomes more uniform as Li/Na ratio is further from the eutectic composition. The 67/33 composition showed the least electrolyte segregation. These strip samples were mounted in epoxy to permit sampling for chemical analysis.

Bench scale, 10×10-cm MCFC tests were assembled with standard Ni anodes (6% Cr) and Ni cathodes. The electrolyte tile was formed by hot-pressing, and the anode wet seal was aluminized with aluminum foil. Six Li/Na carbonate compositions were tested. All cells were operated for at least 500 h at 650° C. For the purposes of investigating the electrolyte segregation phenomenon, the cells were operated at 400 mA/cm² for at least 0.5 h at the end of the life test. The cells were rapidly quenched to fix compositional gradients. Metallographic and analytical probe methods (secondary ion mass spectroscopy [SIMS]) were used to determine composition and amount of carbonate in the MCFC components.

Performance data of the bench scale tests were used to compare the performance of Li/Na electrolyte compositions. Data on cell impedance, cell voltage, electrode performance at various utilizations, and current density operation were collected as a function of time at 1 atm with laboratory standard oxidant (air+28% $CO_2$) and humidified fuel (80% $H_2$ +$CO_2$). The Li/Na composition affected the polarization curves of these four cells. These tests were conducted with fuel and oxidant flows for 60% and 40% utilizations, respectively, and at 320 mA/cm² and 650° C. Independent of the factors of the strip test, fuel cell performance improved as the non-segregating electrolyte property was enhanced. By comparison, it is well known that high current density operation in Li/K carbonate cells leads to early cell shorting (see for example FIG. 15). An electrolyte segregation phenomenon or electrolyte freezing would present problems for high current density operation. This phenomenon was not seen for the nonsegregating Li/Na composition.

EXAMPLE II

As previously described, electrolyte compositions are screened for non-segregation using carbonate-wetted strips which are submitted to 5 to 20 V potential gradients. These conditions simulate the gasketing strip of an externally-manifolded MCFC. In our case, strips of carbonate-wetted $LiAlO_2$ (from Cyprus-Foote as described in hereinbefore) were made from cold-pressed powders (150 MPa). The strip is purged with a 1:2 $O_2$:$CO_2$ gas mixture (500 ml/min) at 655±10° C. After 72 h at 20V, the potential distribution in the strip reached equilibrium. The strips were quenched under load and later examined by metallography. These strips were sectioned for chemical analysis by inductively-coupled, atomic emission spectroscopy (ICP/AES). Samples of 2-g were removed from several regions along the 12-cm strip length. From the ICP/AES results, cation ratios and electrolyte fill in each of the locations were calculated.

Based on the published $Li_2CO_3$-$Na_2CO_3$ phase diagram, we chose the 52/48 Li/Na eutectic composition as a baseline for the study. The variation in cation composition vs strip length was linear; therefore, these deviations were represented as a single cation separation value or a segregation factor, given in terms of (m/o)/cm.

Figure 6:
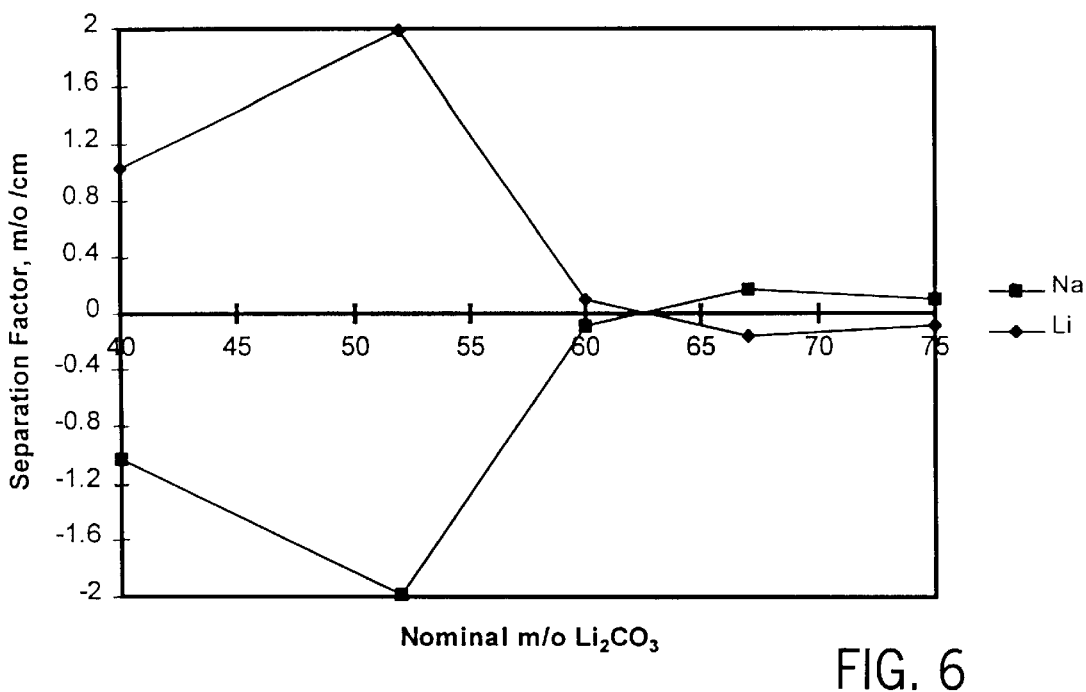
FIG. 6 illustrates a segregation factor (m/o per cm) for a range of Li/Na carbonate electrolytes.

The ICP/AES results are presented in a plot of electrolyte segregation vs Li/Na carbonate composition (see FIG. 6). The plot shows that the non-segregating range is about 60–75 m/o Li. Surprisingly, the eutectic 52/48 m/o Li/Na carbonate displays the greatest cation segregation. Even on the Na-rich side of the eutectic composition, 40/60 Li/Na carbonate exhibits lower cation segregation than does the eutectic.

Figure 4:
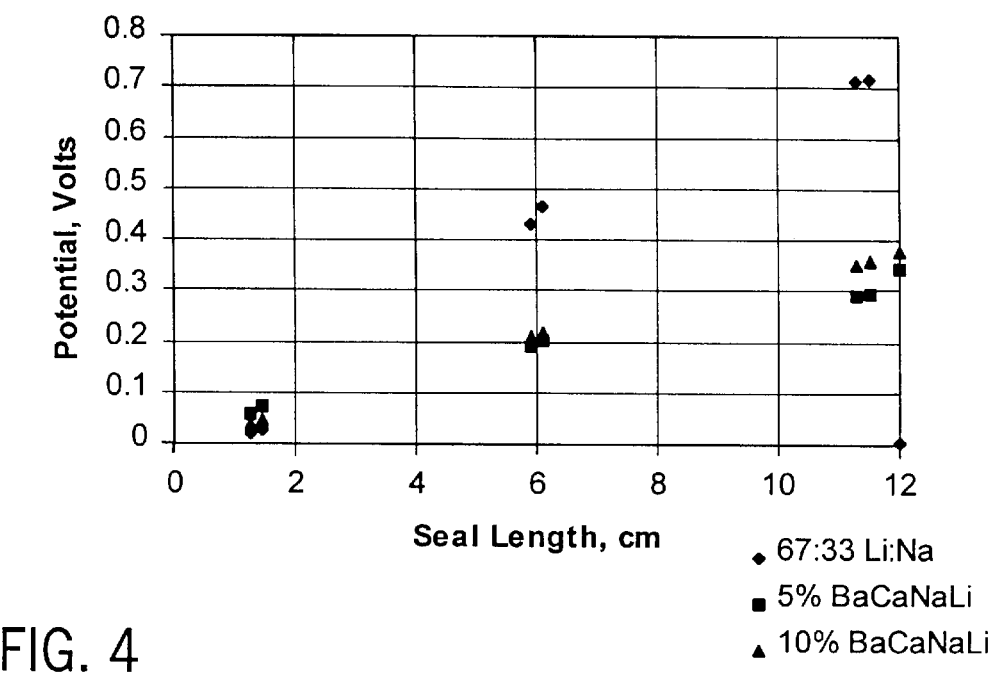
FIG. 4 illustrates voltage distribution for a strip test at 20V for a range of electrolyte compositions including Li/Na (67:33), 5 m/o BaCaNaLi and 10 m/o BaCaNaLi.

The voltage profiles determined in the strip tests (FIGS. 3 & 4) are believed to be a reliable indicator of cation segregation, but the relation of these potentials with carbonate composition is not well understood; thus, the potential distribution is used as a secondary indicator of electrolyte segregation.

The trend in electrolyte fill vs composition is analogous to that of electrolyte segregation. The greatest change occurs with the eutectic Li/Na carbonate, which also displays the greatest cation segregation. We found that Li/Na carbonate electrolyte migration tends toward the cathode. This migration pattern is the opposite of that found using Li/K carbonates, and post-test examinations of bench-scale cell tests have shown flooded cathodes.

EXAMPLE III

Figure 7A:
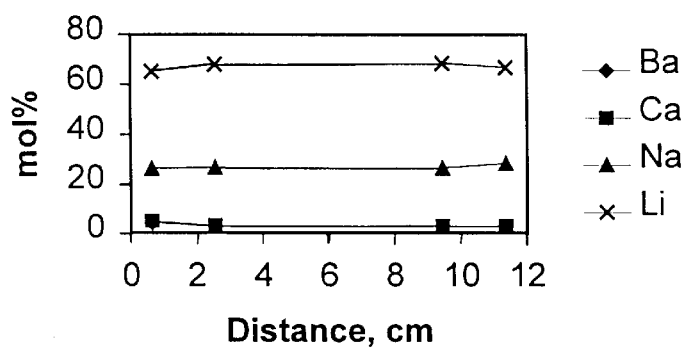
FIG. 7A illustrates segregation effects of a fully developed cation composition distribution of 12 cm long strips with 20 V applied for a 3/3/28/66 m/o BaCaNaLi carbonate and FIG. 7B is for a 5/5/38/52 BaCaNaLi carbonate.
Figure 7B:
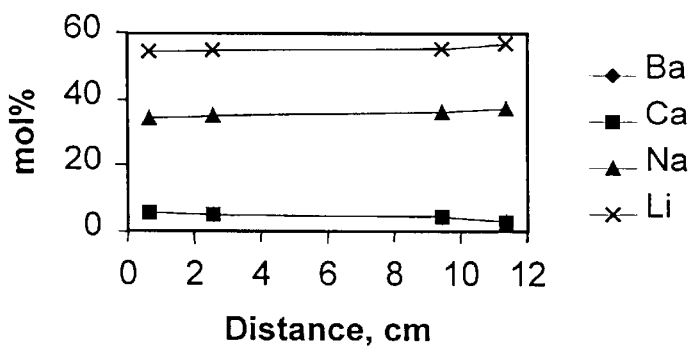

The quaternary BaCaNaLi carbonates (3 and 5 m/o) were also examined in strip tests. Cation composition vs position in the test strips are presented in FIGS. 7A (3 m/o) and 7B (5 m/o). For both compositions, a small degree of cation segregation is apparent, with Ba/Ca concentration increasing at the positive end of the strip. The 3% BaCaNaLi is quite close to a non-segregating electrolyte with 90% of the strip consisting substantially of the starting BaCaNaLi composition.

EXAMPLE IV

Benchscale, 10×10-cm MCFC tests were assembled with standard Ni anodes (6% Cr) and Ni cathodes. The electrolyte tiles were formed by hot-pressing. The anode wet seal was aluminized with aluminum foil. Six Li/Na compositions and three BaCaNaLi compositions (in m/o: 11/10/38/41, 5/5/38/52, and 3/3/28/66) were tested. All cells were operated for at least 500 h at 650° C. To investigate the electrolyte segregation phenomenon, the cells were operated at least 320 $mA/cm^2$ for at least ½ h at the end of the life test. The cells were rapidly quenched to fix compositional gradients. Metallographic and chemical analysis were used to determine composition and amount of carbonate in the MCFC components.

Performance data of the benchscale tests were used to compare the performance of Li/Na electrolyte compositions. Data on cell impedance, cell voltage, electrode performance at various utilizations and current density operation were collected as a function of time at 1 atm with laboratory standard oxidant (air+28% $CO_2$) and humidified fuel (80% $H_2$+$CO_2$).

FIG. 8 shows the polarization behavior of MCFC cell tests using six different Li/Na electrolyte compositions. These tests are conducted with fuel and oxidant utilizations of 60% and 40%, respectively, at 320 $mA/cm^2$ and 650° C. Cell area-specific impedances (a combination of iR losses and electrode polarization) for the six Li/Na electrolyte compositions are shown in FIG. 9 as a function of Li m/o for the Li/Na compositions. The cell tests displayed improved performance as the electrolyte composition approached the non-segregating range.

Figure 15:
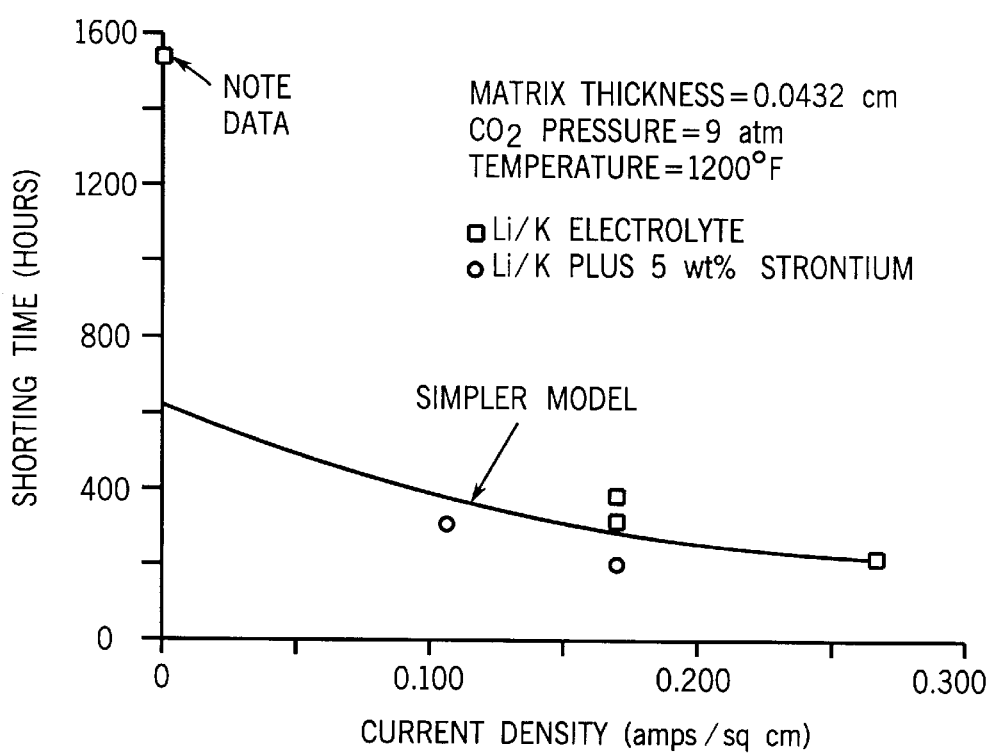
FIG. 15 illustrates effect of current density on shorting time in a conventional prior art system.

High current density operation in conventional Li/K carbonate cells leads to early cell shorting (see FIG. 15). Electrolyte segregation phenomena or electrolyte freezing present problems for high current density operation. The 71.5/28.5 Li/Na composition exhibited a cell potential of 0.76 V at 320 $mA/cm^2$, but this appears to be the upper limit of improved cell performance due to higher Li content electrolytes. The cell performance of the 75/25 Li/Na electrolyte composition (0.71 V at 320 $mA/cm^2$), although still much improved as compared to the 52/48 Li/Na, is lower than that of the 71.5/28.5 Li/Na electrolyte cell. Nonetheless, these cell tests suggest electrolytes in the composition range of at least 65–75 m/o Li (and likely 60–75 m/o) improve cell performance over the 52/48 Li/Na eutectic.

EXAMPLE V

Figure 10:
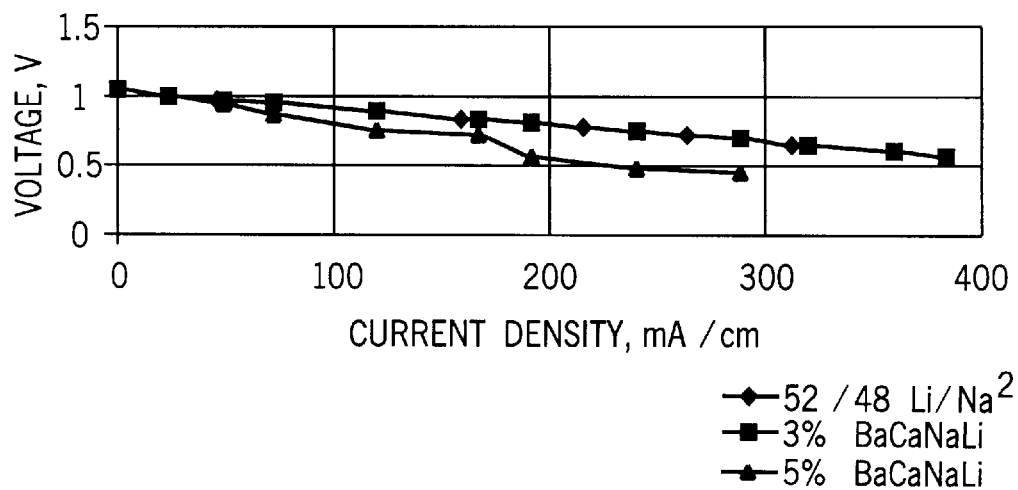
FIG. 10 illustrates polarization curves for 10 cm ×10 cm test cells at 650° C. for 52/48 Li/Na electrolyte and compared with 3 m/o BaCaNaLi (3/3/28/66) carbonate and 5 m/o BaCaNaLi (5/5/38/52) carbonate electrolyte after greater than 100 h operation.
Figure 11:
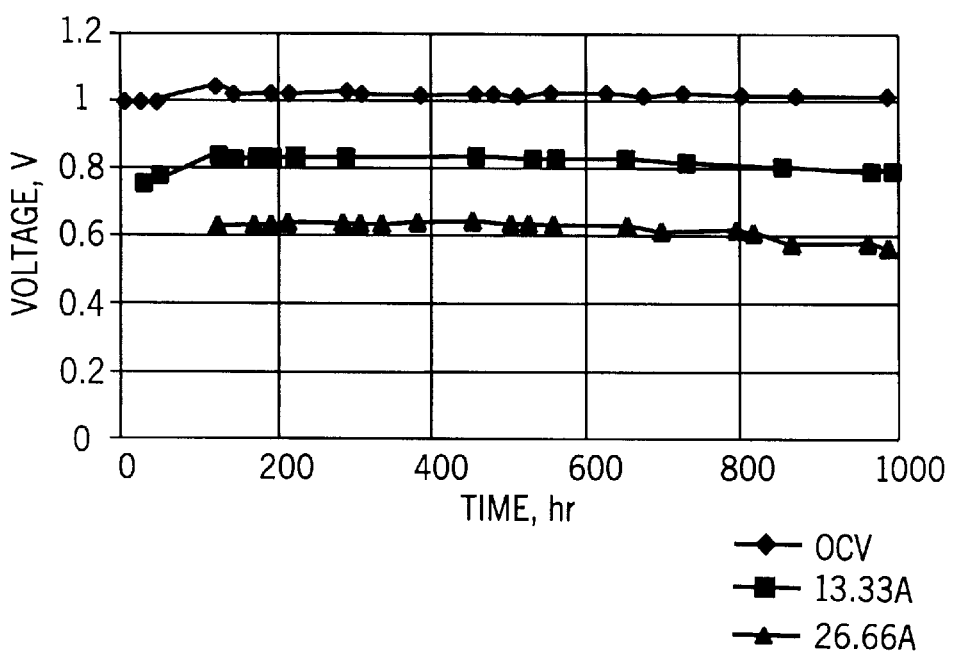
FIG. 11 illustrates operating time plots of MCFC of 84 $cm^2$ area having 3 m/o BaCaNaLi electrolyte (3/3/28/66) operated at 665° C. and at a variety of current operational levels with 60/40% fuel/oxidant utilizations.

A 10×10-cm MCFC test of quaternary BaCaNaLi carbonate electrolytes showed stable cell potentials for more than 1000 h. Earlier 5% BaCaNaLi could not be operated at 320° C., $mA/cm^2$ without polarizing over time. Polarization curves (FIG. 10) were taken under similar conditions as those of the 52/48 Li/Na carbonate cell. At 160 $mA/cm^2$ (60/40% fuel/oxidant utilization), the 3% BaCaNaLi carbonate cell had a stable voltage of 0.81 V. A cell-test with 3% BaCaNaLi electrolyte exhibits long-term stable operation at 320 $mA/cm^2$ (see FIG. 11).

Melting points were determined for selected BaCaNaLi carbonate compositions. The compositions have 3–10 m/o Ba+Ca. Melting point data were obtained by different thermal analysis (DTA). The Ba plus Ca addition was found to depress the melting point to about 450–460° C. in all cases. The quaternary composition was further altered to obtain a congruent melt at a reduced BaCa content (<10% mole for Ba+Ca).

EXAMPLE VI

Figure 12:
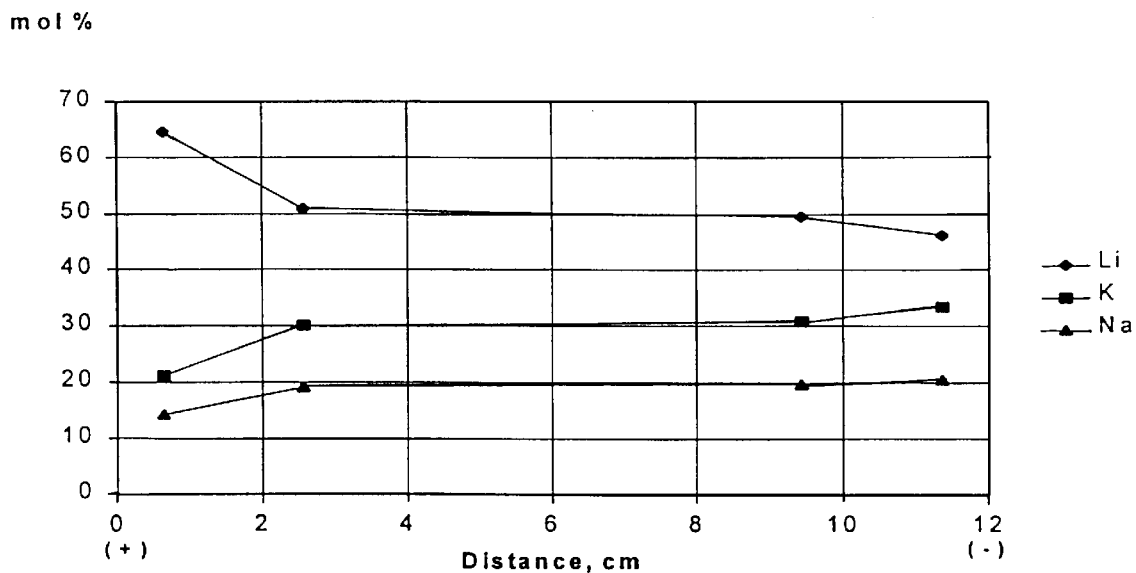
FIG. 12 illustrates the fully developed cation composition distribution of 12 cm long strips with 20 V applied for a Li/Na/K carbonate electrolyte.

In another example showing segregation characteristics of a Li/Na/K electrolyte, the standard procedure of the strip gasket test was performed. The ICP/AES results for a strip test of the Li/Na/K carbonate composition are presented in a plot of cation composition vs. strip length (see FIG. 12); the plot shows that the Li/Na/K carbonate has considerable cation segregation. Also, the trend in electrolyte fill vs composition is analogous to that of Li/Na electrolyte segregation. The greatest change in electrolyte fill occurs with the eutectic Li/Na carbonate. We found that Li/Na/K carbonate electrolyte migration is the greatest of any carbonate electrolyte screened; its electrolyte fill ratio varied 100% across the strip.

EXAMPLE VII

In another example a variety of BaCaNaLi carbonate compositions were subjected to benchscale cell tests. Benchscale, 10×10-cm MCFC tests were assembled with standard Ni anodes (6% Cr) and Ni cathodes. The electrolyte tiles were formed by hot-pressing. The anode wet seal was aluminized with aluminum foil. Four BaCaNaLi carbonate compositions (in m/o: 11/10/38/41, 5/5/38/52, 3/3/28/66, and 2/2/38/58) were tested. All cells were operated for at least 500 h at 650° C. To investigate the electrolyte segregation phenomenon, the cells were operated at least 320 mA/cm$^2$ for at least ½ h at the end of the life test. The cells were rapidly quenched to fix compositional gradients. Metallographic and chemical analysis were used to determine composition and amount of carbonate in the MCFC components.

Performance data of the benchscale tests were used to compare the performance of Li/Na electrolyte compositions. Data on cell impedance, cell voltage, electrode performance at various utilizations and current density operation were collected as a function of time at 1 atm with laboratory standard, oxidant (air+28% $CO_2$) and humidified fuel (80% $H_2$+$CO_2$).

Figure 13:
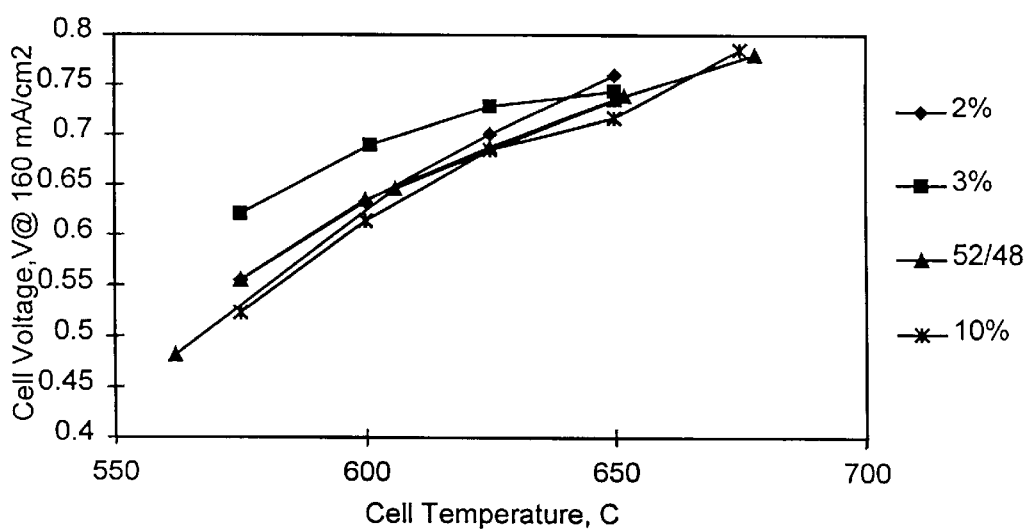
FIG. 13 illustrates temperature sensitivity with different MCFC electrolytes (2 m/o, 3 m/o and 10 m/o BaCaNaLi) along with a baseline of 52/48 eutectic Li/Na carbonate with the cells operated at 160 $mA/cm^2$.

The results of 10×10-cm MCFC test with quaternary BaCaNaLi carbonate electrolytes showed a prospect for reduced temperature operation (see FIG. 13). These cells display stable cell potentials for more than 1000 h at 160 mA/cm$^2$ (60/40% fuel/oxidant utilization) and also 320 mA/cm$^2$. Cell performance and polarization curves were taken under similar conditions as those of the 52/48 Li/Na carbonate cell. The four cells were operated over a temperature range of 550–700° C. to establish performance vs temperature characteristics. The baseline 52/48 Li/Na and 10% BaCaNaLi show very similar temperature characteristics. At 550° C., the 3% BaCaNaLi carbonate cell had a stable voltage 75 mV greater than that of the baseline 52/48 Li/Na. At 550° C., the 2% BaCaNaLi carbonate cell exhibits a 25 mV improvement. Both 2% and 3% BaCaNaLi could be operated at 320 mA/cm$^2$. The quaternary 3% BaCaNaLi carbonate electrolytes present prospects for improved cell stability at 320 mA/cm$^2$ as well as 50–75° C. lower operating temperature.

Further, cell area-specific impedances (a combination of iR losses and electrode polarization) for Li/Na electrolyte cell tests are correlated with a segregation factor from strip screening tests (see FIG. 14). This can be done due to variation in cation composition versus strip length being linear. These deviations were represented as single cation separation value or a segregation factor, given in terms of m/o per cm. This correlation indicates the carbonate composition at the electrodes plays a significant role in the MCFC performance and overrides the effect of electrolyte conductivity.

While preferred embodiments of the inventions have been shown and described, it will be clear to those of skill in the art that various changes and modifications can be made without departing from the invention in its broader aspects as set forth in the claims provided hereinafter.

What is claimed is:

1. An electrolyte tile consisting essentially of a Li/Na carbonate with a $Li_2CO_3$ mole percent selected from the group consisting of about 30 to 40 and 55 to 80.

2. The electrolyte tile as defined in claim 1 further including about 70 to 60 and 45 to 20 mole percent $Na_2CO_3$, respectively relative to the $Li_2CO_3$ mole percent.

3. The electrolyte tile as defined in claim 1 wherein the mole percent of $Li_2CO_3$ is about 55 to 80 mole percent $Li_2CO_3$.

4. The electrolyte tile as defined in claim 1 wherein the mole percent of $Li_2CO_3$ is about 60 to 75 mole percent $Li_2CO_3$.

5. The electrolyte tile as defined in claim 3 further including about 45 to 25 mole percent $Na_2CO_3$.

6. The electrolyte tile as defined in claim 4 further including about 40 to 25 mole percent $Na_2CO_3$.

7. The electrolyte tile as defined in claim 1 wherein said Li/Na carbonate includes at least one phase selected from the group consisting of solid $Li_2CO_3$, solid $Na_2CO_3$, molten $Li_2CO_3$ and molten $Na_2CO_3$.

8. The electrolyte tile as defined in claim 7 wherein the electrolyte tile is at a temperature between about 550° to 750° C.

9. The electrolyte tile as defined in claim 1 further including an electrolytic cell which includes the carbonate electrolyte wherein an impedance of the cell is about 50% less than for an electrolytic cell having a eutectic Li/Na carbonate electrolyte.

10. The electrolyte tile as defined in claim 1 further including an alkaline earth carbonate.

11. An electrolyte tile consisting essentially of a CaBaLiNa carbonate having Ca carbonate and Ba carbonate less than about 15 mole percent each and more than about 1 mole percent.

12. The electrolyte tile as defined in claim 11 wherein said carbonate has a composition positioned along a quaternary eutectoid surface.

13. The electrolyte tile as defined in claim 11 further including an alkaline earth carbonate.

14. The electrolyte tile as defined in claim 11 wherein the Ca carbonate has an equivalent mole percent to Ba carbonate.

15. The electrolyte tile as defined in claim 11 having a melting point of about 450° C.

16. A fuel cell comprised of:

a cathode;

an anode; and an electrolyte tile consisting essentially of a carbonate selected from the group consisting of a Li/Na carbonate having a $Li_2CO_3$ mole percent of about 60–75 and a CaBaLiNa carbonate having Ca and Ba mole percents of about 2–10.

17. The fuel cell as defined in claim 16 wherein the $Li_2CO_3$ is greater than about 50 m/o.

* * * * *